(12) United States Patent
Harasyn et al.

(10) Patent No.: US 7,308,830 B2
(45) Date of Patent: Dec. 18, 2007

(54) PRESSURE SENSOR FAULT DETECTION

(75) Inventors: Donald E. Harasyn, Eden Prairie, MN (US); Charles R. Willcox, Eden Prairie, MN (US); Andrew J. Klosinski, Chaska, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 11/340,316

(22) Filed: Jan. 26, 2006

(65) Prior Publication Data

US 2007/0169557 A1 Jul. 26, 2007

(51) Int. Cl.
*G01L 9/12* (2006.01)
(52) U.S. Cl. .................. 73/718; 73/724; 361/283.1
(58) Field of Classification Search .............. 73/718, 73/724; 361/283.1, 283.3
See application file for complete search history.

(56) References Cited

U.S. PATENT DOCUMENTS

| | | | | |
|---|---|---|---|---|
| 2,533,339 A | 12/1950 | Willenborg | ............... | 177/311 |
| 3,012,432 A | 12/1961 | Moore et al. | ............... | 73/40 |
| 3,218,863 A | 11/1965 | Calvert | ............... | 73/398 |
| 3,232,712 A | 2/1966 | Stearns | ............... | 23/255 |
| 3,249,833 A | 5/1966 | Vosteen | ............... | 317/246 |
| 3,374,112 A | 3/1968 | Danon | ............... | 117/226 |
| 3,557,621 A | 1/1971 | Ferran | ............... | 73/398 |
| 3,697,835 A | 10/1972 | Satori | ............... | 317/246 |
| 3,808,480 A | 4/1974 | Johnston | ............... | 317/256 |
| 3,924,219 A | 12/1975 | Braun | ............... | 338/34 |
| 4,008,619 A | 2/1977 | Alcaide et al. | ............... | 73/398 |
| 4,158,217 A | 6/1979 | Bell | ............... | 361/283 |
| 4,168,518 A | 9/1979 | Lee | ............... | 361/283 |
| 4,177,496 A | 12/1979 | Bell et al. | ............... | 361/283 |
| 4,227,419 A | 10/1980 | Park | ............... | 73/724 |
| 4,287,553 A | 9/1981 | Braunlich | ............... | 361/283 |
| 4,322,775 A | 3/1982 | Delatorre | ............... | 361/283 |
| 4,336,567 A | 6/1982 | Anastasia | ............... | 361/283 |
| 4,358,814 A | 11/1982 | Lee et al. | ............... | 361/283 |
| 4,370,890 A | 2/1983 | Frick | ............... | 73/718 |
| 4,389,895 A | 6/1983 | Rud, Jr. | ............... | 73/724 |
| 4,422,125 A | 12/1983 | Antonazzi et al. | ............... | 361/283 |
| 4,422,335 A | 12/1983 | Ohnesorge et al. | ............... | 73/724 |
| 4,434,451 A | 2/1984 | Delatorre | ............... | 361/283 |
| 4,455,874 A | 6/1984 | Paros | ............... | 73/704 |
| 4,458,537 A | 7/1984 | Bell et al. | ............... | 73/718 |
| 4,490,773 A | 12/1984 | Moffatt | ............... | 361/283 |
| 4,542,436 A | 9/1985 | Carusillo | ............... | 361/283 |

(Continued)

FOREIGN PATENT DOCUMENTS

DE 33 408 34 A1 5/1985

(Continued)

*Primary Examiner*—Andre J. Allen
(74) *Attorney, Agent, or Firm*—Westman, Champlin & Kelly, P.A.

(57) ABSTRACT

A diagnostic system for a pressure sensor having a cavity configured to receive on applied pressure is provided. The cavity has a first and a second wall. A deflectable diaphragm is positioned in the cavity and configured to form a first and a second capacitance with the first wall and a third and a fourth capacitance with the second wall which change in response to the applied pressure. The capacitances form a first transfer function and a second transfer function. Changes in the first transfer function relative to the second transfer function are detected to provide a diagnostic output.

20 Claims, 6 Drawing Sheets

U.S. PATENT DOCUMENTS

| | | | |
|---|---|---|---|
| 4,562,742 A | 1/1986 | Bell | 73/718 |
| 4,670,733 A | 6/1987 | Bell | 338/36 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 5,094,109 A | 3/1992 | Dean et al. | 73/718 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,329,818 A | 7/1994 | Frick et al. | 73/708 |
| 5,479,827 A * | 1/1996 | Kimura et al. | 73/718 |
| 5,492,016 A | 2/1996 | Pinto et al. | 73/724 |
| 5,542,300 A | 8/1996 | Lee | 73/724 |
| 5,637,802 A | 6/1997 | Frick et al. | 73/724 |
| 5,642,301 A | 6/1997 | Warrior et al. | 364/571.02 |
| 5,705,978 A | 1/1998 | Frick et al. | 340/511 |
| 5,753,820 A * | 5/1998 | Reed et al. | 73/706 |
| 5,757,608 A | 5/1998 | Bernot et al. | 361/283.04 |
| 5,911,162 A | 6/1999 | Denner | 73/718 |
| 5,992,240 A | 11/1999 | Tsuruoka et al. | 73/718 |
| 6,236,096 B1 | 5/2001 | Chang et al. | 257/419 |
| 6,295,875 B1 * | 10/2001 | Frick et al. | 73/718 |

FOREIGN PATENT DOCUMENTS

| | | |
|---|---|---|
| EP | 0 524 550 A1 | 1/1993 |
| WO | WO 99/53286 | 10/1999 |

* cited by examiner

US 7,308,830 B2

PRESSURE SENSOR FAULT DETECTION

BACKGROUND OF THE INVENTION

The present invention relates to pressure sensors of the type used to measure the pressure of process fluid. More specifically, the present invention relates to diagnostics of such pressure sensors.

Transmitters are used in process monitoring and control systems to measure various process variables of industrial processes. One type of transmitter measures pressure of process fluid in the process. Various techniques have been used in the pressure sensors used in such transmitters. One well-known technique is to use a deflectable diaphragm. A capacitance is measured with respect to the diaphragm, with the diaphragm forming one of the capacitive plates of the capacitor. As the diaphragm is deflected due to applied pressure, the measured capacitance changes. In such a configuration, there are a number of sources of inaccuracies in pressure measurements.

One technique which addresses these inaccuracies is set forth in U.S. Pat. No. 6,295,875 entitled, "PROCESS PRESSURE MEASUREMENT DEVICES WITH IMPROVED ERROR COMPENSATION" issued Oct. 2, 2001 to Frick et al. which is incorporated herein by reference in its entirety. This patent describes a differential pressure sensor that includes an additional electrode for use in reducing measurement inaccuracies. However, it is desirable to perform diagnostics on such pressure sensors to detect the occurrence of a fault, or the possibility of an impending fault.

SUMMARY OF THE INVENTION

A diagnostic system for a pressure sensor includes a cavity configured to receive an applied pressure. The cavity has a first and a second wall. A deflectable diaphragm is positioned in the cavity and is configured to form a first and a second capacitance with the first wall and a third and a fourth capacitance with the second wall. The capacitances change in response to the applied pressure. The first and third capacitances form a first transfer function and the second and the fourth capacitances form a second transfer function. Circuitry is configured to detect changes in the first and second transfer functions.

DETAILED DESCRIPTION OF ILLUSTRATIVE EMBODIMENTS

The present invention provides an apparatus and method for detecting faults or impending failures of a multi-electrode capacitance-based pressure sensor. With the present invention, changes in transfer functions of capacitors in the pressure sensor are used to diagnose operation of the pressure sensor.

As discussed in the background section, U.S. Pat. No. 6,295,875 entitled PROCESS PRESSURE MEASUREMENT DEVICES WITH IMPROVED ERROR COMPENSATION describes a pressure sensor with improved accuracy. However, faults within the pressure sensor can occur which can reduce the accuracy of the pressure measurements. The present invention provides a method and apparatus for detecting such faults. Example faults include changes in the size of electrodes, for example, due to flaking or other causes, loss of contact between the electrode and the electrical connection to the electrode, unstable connections or broken wires between measurement circuitry and the electrodes, a "fold-back" condition caused by conductive particles forming a virtual or real short circuit between the electrodes which results in an errant on scale pressure measurement that is actually off scale, non-linearity caused by non-conducting particles that migrate in or out of the gaps between electrodes in the pressure sensor, and changes in the dielectric constant of fill fluid resulting from perforation of an isolator which is used to isolate the pressure sensor from process fluid.

Figure 1:
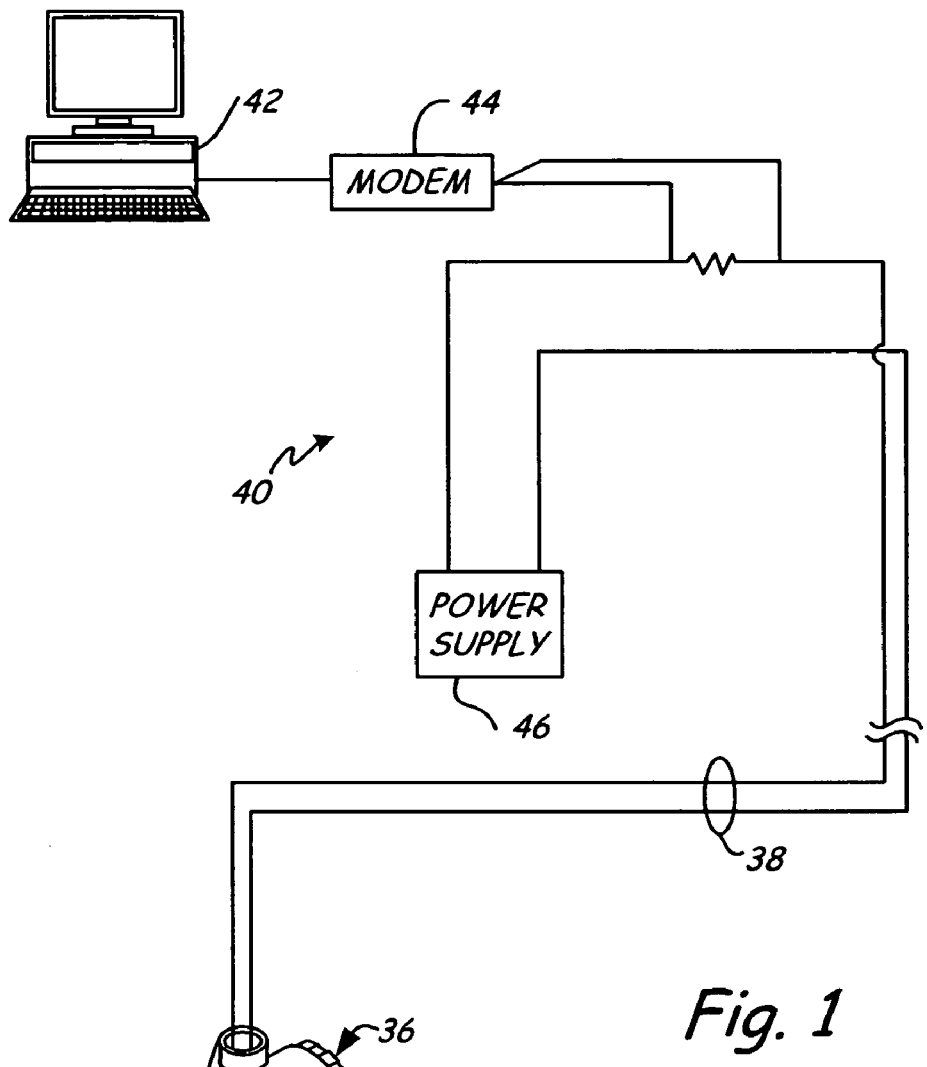
FIG. 1 is a simplified diagram showing a process environment for use with the present invention.

FIG. 1 shows generally the environment of a process measurement system 32 of the type which may use a multi-electrode capacitance-based pressure sensor. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses a differential process pressure and converts it to a standardized transmission signal that is a function of the process pressure.

A process loop 38 provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A computer 42 or other information handling system through modem 44, or other network interface, is used for communication with the transmitter 36. A remote voltage power supply 46 powers the transmitter 36. Alternatively, the transmitter can have its own power source and transmit information with wireless-based protocol.

Figure 2:
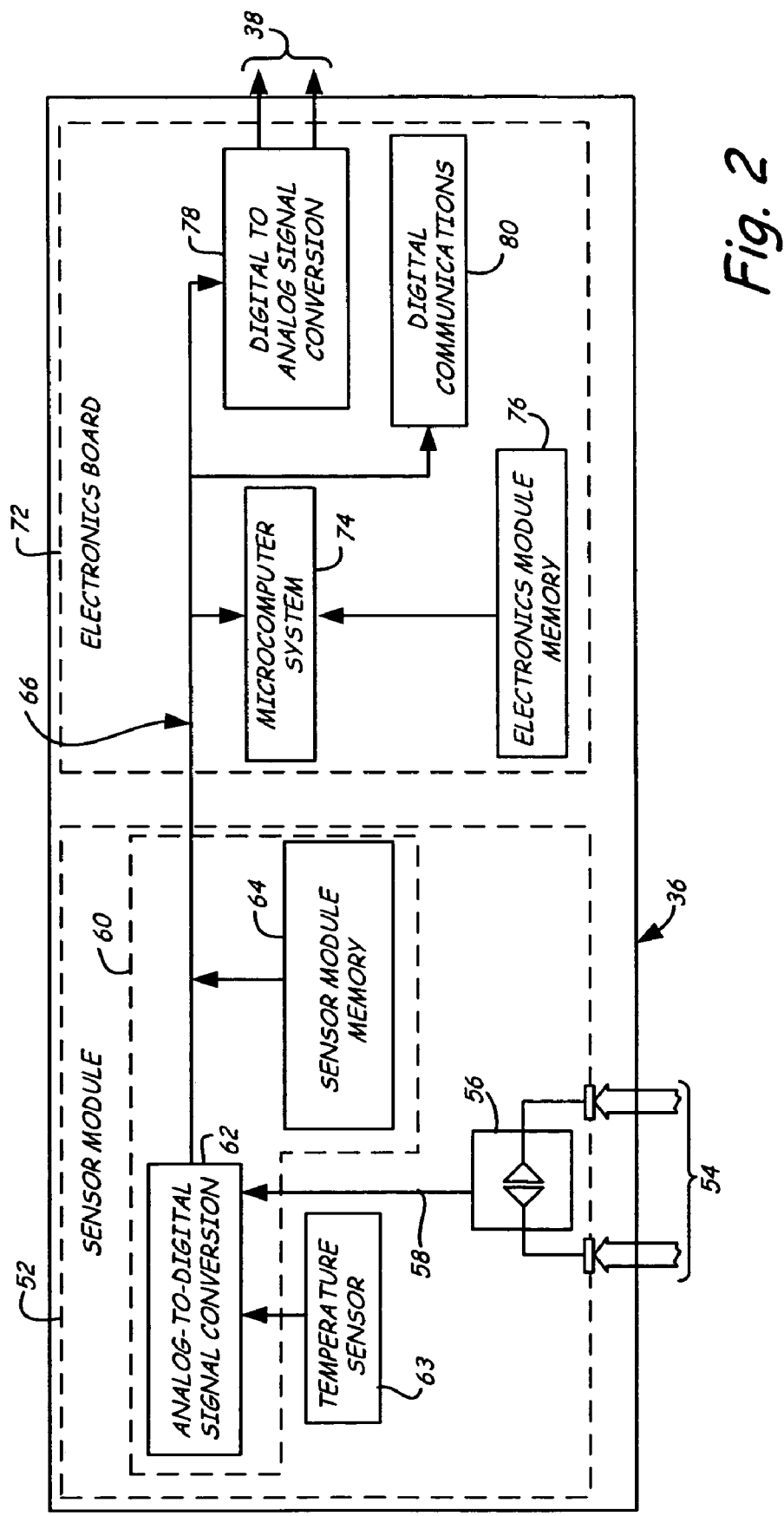
FIG. 2 is a block diagram showing a pressure transmitter configured to implement the diagnostic capabilities of the present invention.

FIG. 2 is a simplified block diagram of pressure transmitter 36. Pressure transmitter 36 includes a sensor module 52 and an electronics board 72 coupled together through a databus 66. Sensor module electronics 60 couples to pressure sensor 56 which receives an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80.

In accordance with techniques set forth in U.S. Pat. No. 6,295,875 to Frick et al., pressure transmitter 36 senses differential pressure. However, the present invention is not limited to such a configuration.

Figure 3:
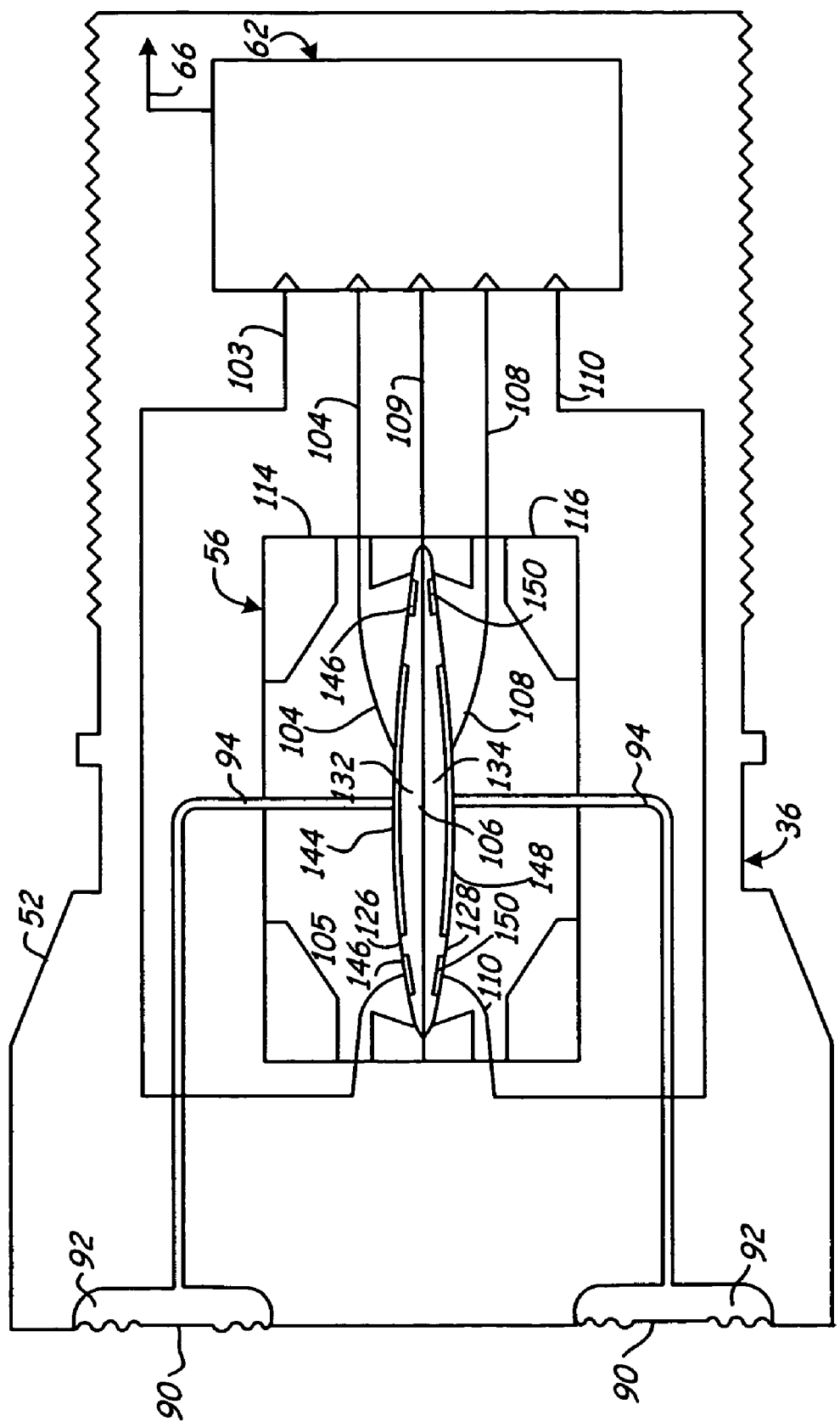
FIG. 3 is a cross-sectional view of a portion of the transmitter FIG. 2 showing a pressure sensor for implementing the present invention.

FIG. 3 is a simplified cross-sectional view of one embodiment of a sensor module 52 showing pressure sensor 56. Pressure sensor 56 couples to a process fluid through isolation diaphragms 90 (see FIG. 3) which isolate the process fluid from cavities 92. Cavities 92 couple to the pressure sensor module 56 through impulse piping 94. A substantially incompressible fill fluid fills cavities 92 and impulse piping 94. When a pressure from the process fluid is applied to diaphragms 90, it is transferred to the pressure sensor 56.

Pressure sensor 56 is formed from two pressure sensor halves 114 and 116 and filled with a preferably brittle, substantially incompressible material 105. A diaphragm 106 is suspended within a cavity 132, 134 formed within the sensor 56. An outer wall of the cavity 132, 134 carries electrodes 146, 144, 148 and 150. These can, generally, be referred to as primary electrodes for capacitor plates 144 and 148 and secondary electrodes for capacitor plates 146 and 150. These electrodes form capacitors with respect to the moveable diaphragm 106. The capacitors, again, can be referred to as primary and secondary capacitors.

As illustrated in FIG. 3, the various electrodes in sensor 56 are coupled to analog to digital converter 62 over electrical connection 103, 104, 108 and 110. Additionally, the deflectable diaphragm 106 couples to analog to digital converter 62 through connection 109.

As discussed in U.S. Pat. No. 6,295,875, the differential pressure applied to the sensor 56 can be measured using the electrodes 144-150. As discussed below, the capacitance measured using these electrodes can also be used to diagnose the condition of pressure sensor 56. With the present invention, a new capacitance transfer function is provided such that the differential pressure (DP) information available from the main electrodes 144 and 148 can be compared to the differential pressure information available from the ring electrodes 146 and 150. The capacitance transfer function, H, provides an output that is constant and has an initial value denoted by $H_0$ that represents the factory calibrated state of the pressure sensor 56. The output of the H function is essentially independent of the applied differential pressure and line pressure and can be provided substantially in "real time" to an operator or user in the form of a diagnostic output. The transfer function can be implemented and monitored in, for example, microcomputer system 74 shown in FIG. 2. The H transfer function can be used to monitor a single fault during the operation of the sensor, as well as monitoring for simultaneous reinforcing faults. Counteracting faults such as a reduction in area of the main electrode and ring electrode by the same relative percentage, on the same side of the diaphragm, might not be detected by the transfer function H. However, counteracting faults likewise do not cause as much error in the differential pressure output signal.

As discussed above, damage to the sensor electrodes can cause inaccurate pressure measurements which can vary from small shifts to large off scale failures. The damage to the sensor electrode can be from many sources. For example, portions of the vapor deposited electrodes may lose adhesion to the cavity wall due to underlying contamination such as from organic films or other contaminants present in the manufacturing process. The severity of the sensor errors varies directly with electrode loss. Thin electrodes can also compromise the reliability of the contact made between the electrode and the electrical wire which contacts the electrode. Furthermore, the wire leads from the sensor to the electronic circuitry within the transmitter may become damaged during manufacture or use. Wire splices or connections can also become damaged. Such manufacturing flaws are difficult to detect through inspection. Further, during service such flaws can become progressively worse, leading to sensor drift, instability, or loss of signal. The differential pressure signal can also be disrupted by a conductive particle contacting the sensor diaphragm in either of the opposing electrodes. This can potentially lead to a "fold-back" condition during an overpressure in which an off scale reading is sensed as a normal pressure. Further, such conductive particles can lead to a large current draw through the electrodes 146, 150 which can appear as a large capacitance. If this occurs when the applied differential pressure is beyond the upper range limit of the sensor, the sensor may indicate an erroneous on scale reading. If such a particle is non-conductive, the differential pressure output becomes non-linear because the deflection of the diaphragm is impeded by the particle. With the present invention, the transfer function H is monitored and compared with a nominal value stored in memory, for example a value determined during factory calibration, and used to alert a user if the difference exceeds a desired threshold limit. Such a deviation of the H transfer function from its calibrated value can indicate a fault or impending fault regardless of the differential pressure.

The transfer function H can be derived using the transfer functions $TF_M$ and $TF_R$. These are the transfer functions of the main electrodes 144, 148 and the ring electrodes 146, 150, respectively. $TF_M$ and $TF_R$ linearly vary with deflection of the center diaphragm 106 (CD), which is linearly related to differential pressure. Using a parabolic approximation of the curvature of the cavity and the center diaphragm, it can be shown that the ratio of the diaphragm deflection to the cavity depth is a constant at any radial position from the axis of the sensor 56. Thus, it can be shown that:

$$TF_M \approx TF_R \qquad \text{Eq. 1}$$

$$\frac{M_1 - M_2}{M_1 + M_2} \approx \frac{R_1 - R_2}{R_1 + R_2} \qquad \text{Eq. 2}$$

Where $M_1$ and $M_2$ are the active capacitances (with any stray capacitances removed) formed by the two main electrodes and $R_1$ and $R_2$ are the active capacitance values formed by the ring electrodes relative to the center diaphragm. However, the center diaphragm near the ring electrodes deviates from a spherical (or parabolic) form. This results in a slightly different gage factor denoted by $\alpha$, for the outer electrode rings 146, 150 compared to the main electrodes 144, 148.

Figure 4:
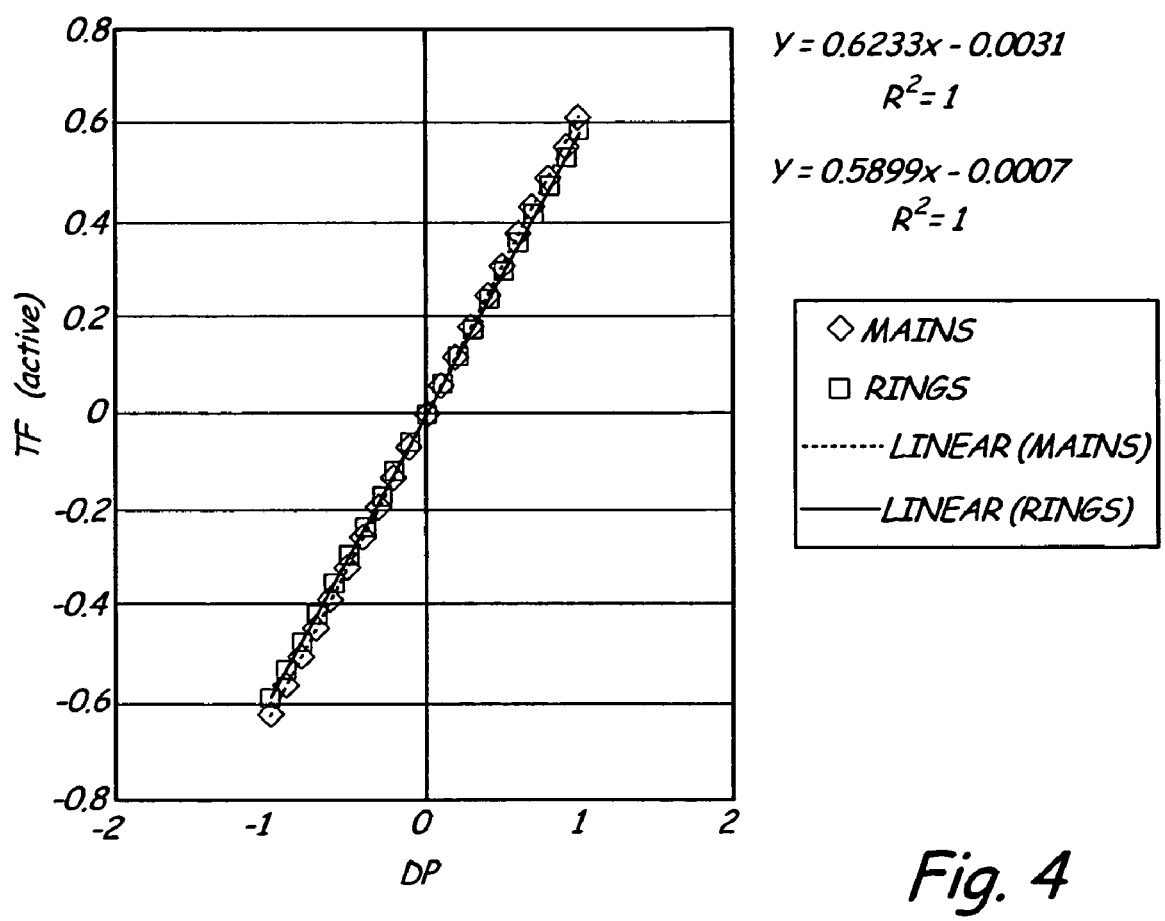
FIG. 4 is a graph comparing a first transfer function (using first and third capacitances) to a second transfer function (using second and fourth capacitances).

FIG. 4 is a graph of $TF_M$ and $TF_R$ versus differential pressure. As can be seen from FIG. 4, there is an approximately 5% difference in the slope of the two transfer functions. The slopes are referred to as the gage factors. The relationships for the transfer functions can be defined as follows:

$$TF_M = \alpha_M DP + b_M \qquad \text{Eq. 3}$$

$$TF_R = \alpha_R DP + b_R \qquad \text{Eq. 4}$$

Where α is the gage factor, DP is the applied differential pressure, b is the y-intercept and the subscripts identify the ring or outer electrodes and the main electrodes.

The differential pressure value is common between equations 3 and 4 so that the equations can be combined into equations 5, 6 and 7 as follows:

$$\frac{TF_M - b_M}{\alpha_M} = \frac{TF_R - b_R}{\alpha_R} \qquad \text{Eq. 5}$$

$$H \equiv \frac{TF_R}{\alpha_R} - \frac{TF_M}{\alpha_M} \qquad \text{Eq. 6}$$

$$H = \frac{b_R}{\alpha_R} - \frac{b_M}{\alpha_M} \qquad \text{Eq. 7}$$

The initial calibrated value of H is denoted by $H_0$ and defined as $$H_0 \equiv \frac{b_R}{\alpha_R} - \frac{b_M}{\alpha_M} \qquad \text{Eq. 8}$$

For each sensor, the values of $\alpha_M$, $\alpha_R$, $b_M$ and $b_R$ are unique constants. Therefore, barring physical changes to the sensor, the value of H is substantially constant regardless of the applied differential pressure. That is, equation 8, $$H_0 \equiv \frac{b_R}{\alpha_R} - \frac{b_M}{\alpha_M}.$$

Note that in the unlikely case that a sensor has no zero offsets, the y-intercepts will be zero in which case H evaluates to zero. In practice, however, there will be slight cavity depth and electrode area mismatches giving rise to small non-zero values of H, which should remain constant over the life of the sensor.

A nominal value of the constant H, $H_0$, can be measured during the manufacturing process. For example, the measurement can be obtained when the differential pressure sensor is calibrated. Unless there is a fault with the electrodes, the calibrated value $H_0$ should not change significantly for the life of the transmitter. The signal-to-noise ratio of the function H should be comparable with $TF_M$ and $TF_R$ which are used to measure the differential pressure. The sensitivity of H to electrode loss and non-linearity effects should therefore be roughly equivalent to the sensitivity of the pressure sensor to the applied differential pressure. However, the sensitivity of H to changes in the fill fluid constant varies directly to the gage factor difference between the main electrodes and the ring electrodes. Therefore, sensitivity to dielectric changes is much less than for electrode loss.

Figure 5A:
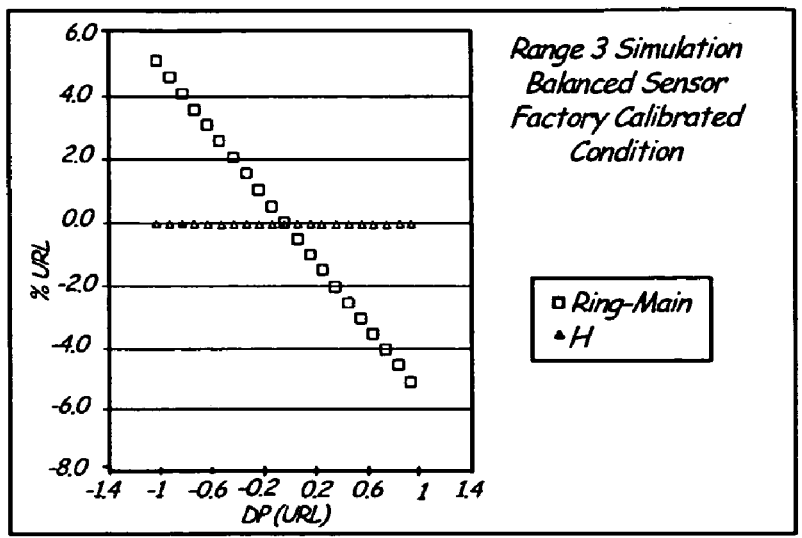
FIGS. 5A, 5B, 5C, 5D and 5E are graphs which illustrate changes in the value of H relative to the main and ring capacitances under a variety of conditions.
Figure 5B:
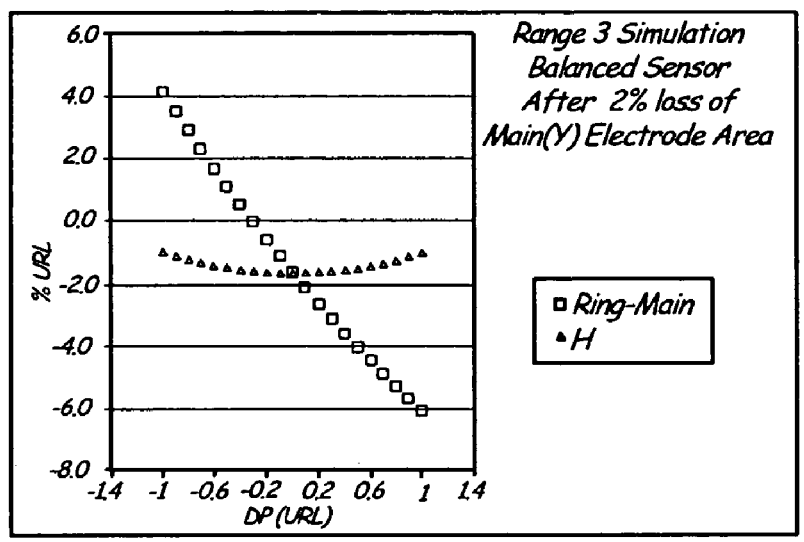
Figure 5C:
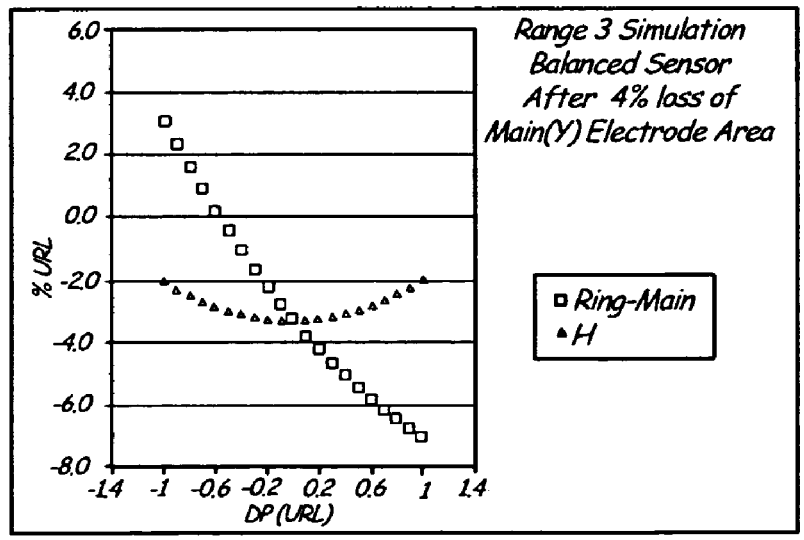
Figure 5D:
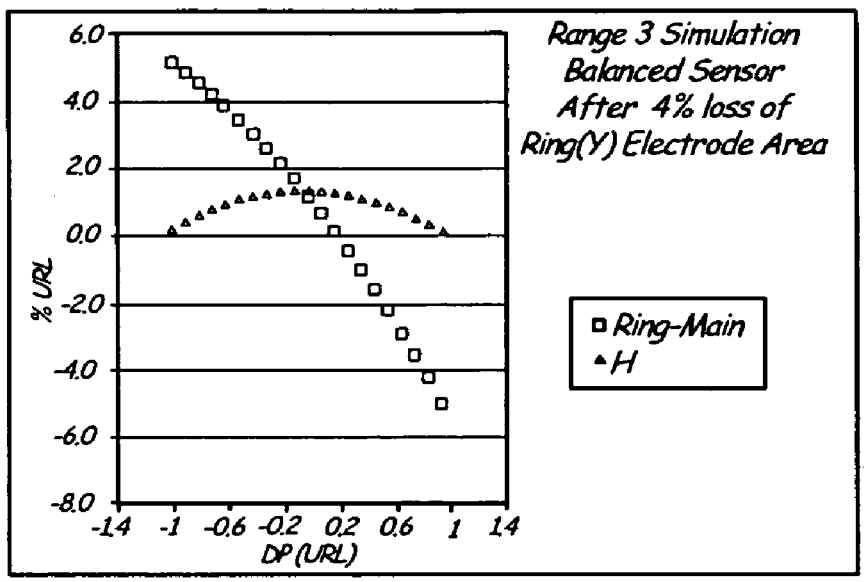
Figure 5E:
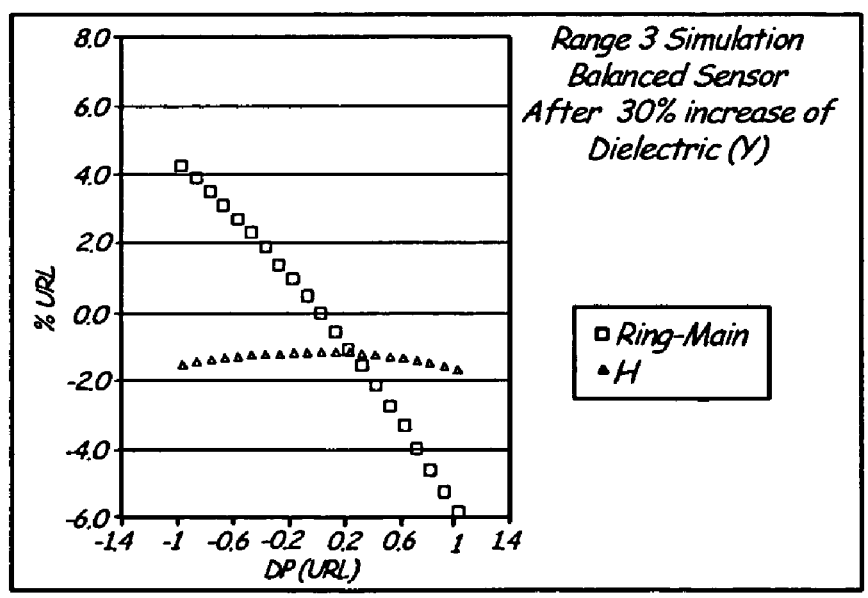

FIG. 5A is a graph of changes in the ring and main electrode capacitances as well as the H value over a range of differential pressures while FIG. 5B shows the same graph after 2% of the main electrode area has been lost. Similarly, FIG. 5C shows the result after 4% of the main electrode area has been lost. FIG. 5D is a graph showing the result of 4% loss of the ring electrode area. FIG. 5E is a graph showing the result of a 30% increase in the dielectric constant of the fill fluid. The sensitivity to changes in the fill fluid dielectric appears strongly dependent upon the gage factor mismatch between the main electrode and the secondary electrode. The sensitivity can be increased by, for example, increasing the thickness of the center diaphragm or reducing the diameter of the hinge point for the diaphragm.

The independence of H relative to the applied differential pressure can be significantly altered by a mismatch in the electrode area while only slightly affected by a mismatch in the cavity depth. In implementations in which H does vary with the applied differential pressure, the value of H with respect to differential pressure can be calibrated during manufacture to increase the sensitivity of the diagnostic system of the present invention to faults.

In operation, the current H value can be calculated using circuitry within the transmitter, for example, microcomputer system 74 shown in FIG. 2. A memory within the microcomputer system 74 can store the nominal or calibrated value of $H_0$. During operation, microcomputer system 74 can periodically calculate the current value of H and compare it to the nominal value. If the current value of H has changed relative to the nominal value greater than a predefined threshold, or other criteria, microcomputer 74 can issue a warning to an operator, for example, by transmitting a message over the two-wire communication loop from 38 or through a local output. H can be calculated periodically, during processor downtimes when additional computation power is available, upon receipt of a command over the two-wire process control loop 38, or by any appropriate mechanism. Additionally, if the value of H for a particular pressure sensor is such that the value varies with another variable, such as the applied differential pressure, H can be calibrated against this variable. In such a configuration, the microprocessor controller can calculate the nominal value of H, $H_0$ based upon the variable and the comparison with the present value of H performed based upon this calibrated value of $H_0$.

In addition to the functions discussed above, the H function can be used to detect leaks in a center diaphragm which could allow the fill fluid to flow between the two halves of the pressure sensor. In such a configuration, the dielectric fill fluid in one half of the sensor should have a dielectric constant which is different than the fill fluid in the other half of the sensor. For ease of implementation, the fill fluid having the higher dielectric constant can be manufactured with smaller electrode areas to compensate for the increase in cell capacitance. In a more specific example, if one dielectric constant is twice the dielectric constant of the other, the size of the electrodes can be reduced by a factor of 2.

Using a different dielectric constant fill fluid, the above techniques utilizing the H function can be used to identify the failing pressure sensor.

Although the present invention has been described with reference to preferred embodiments, workers skilled in the art will recognize that changes may be made in form and detail without departing from the spirit and scope of the invention. Although the present invention has been illustrated with respect to a particular electrode and sensor configuration, the concepts of the present invention are applicable to other configurations and the invention is not limited to the particular configuration discussed herein. The location, shape, size, etc of the electrodes and diaphragm can be changed as appropriate. Further, the present invention uses a number of calculations in implementing the diagnostic function. The invention is not limited to the particular calculations set forth herein and others may be substituted as appropriate.

What is claimed is:

1. A diagnostic system for a pressure sensor, comprising:
a cavity configured to receive an applied pressure, the cavity having a first and a second wall;
a deflectable diaphragm in the cavity configured to form a first and a second capacitance with the first wall and a third and a fourth capacitance with the second wall which change in response to the applied pressure, the first and third capacitances forming a first transfer function and the second and the fourth capacitances forming a second transfer function; and
circuitry coupled to the first, second, third and fourth capacitance having a diagnostic output as a function of the first and second transfer functions which is related to a diagnostic condition of the pressure sensor.

2. The apparatus of claim 1 wherein the circuitry is configured to provide the diagnostic over a two-wire process control loop.

3. The apparatus of claim 1 wherein the circuitry calculates a present value of H based upon the first and second transfer functions.

4. The apparatus of claim 3 wherein the circuitry is further configured to compare the calculated present value of H with a nominal value $H_0$.

5. The apparatus of claim 1 wherein:
the first transfer function is in the form of:

$TF_M = \alpha_M DP + b_M$ and the second transfer function is in the form of:

$TF_R = \alpha_R DP + b_R$ where $\alpha_R$ and $\alpha_M$ are gage factors, DP is an applied differential pressure and $b_M$ and $b_R$ are y-intercepts and the subscript M identifies the first and third capacitances and the subscript R identifies the second and fourth capacitances.

6. The apparatus of claim 5 wherein the circuitry is further configured to calculate a present value of H as:

$$H \equiv \frac{TF_R}{\alpha_R} - \frac{TF_M}{\alpha_M}.$$

7. The apparatus of claim 1 wherein the diagnostic output is indicative of condition of an electrode.

8. The apparatus of claim 1 wherein the diagnostic output is indicative of the group of diagnostic outputs consisting of center diaphragm leaks, a failing pressure sensor, electrode loss, contamination, loss of an electrical connection and damage to wire leads.

9. The apparatus of claim 1 wherein a fill fluid on one side of the deflectable diaphragm has a dielectric constant which differs from a dielectric constant of a fill fluid on the other side of a deflectable diaphragm.

10. A method of diagnosing operation of a pressure sensor, comprising:
measuring first, second, third, and fourth capacitances of the pressure sensor;
calculating a present value of H based upon the measured first, second, third and fourth capacitances;
diagnosing operation of the pressure sensor based upon changes in the calculated value; and
providing a diagnostic output based upon the step of diagnosing.

11. The method of claim 10 wherein the diagnostic output is indicative of a leak in the center diaphragm.

12. The method of claim 10 including providing an output based upon changes in the calculated value.

13. The method of claim 10 wherein the present value of H is based upon a first and a second transfer function.

14. The method of claim 13 including comparing the present value of H with a nominal value.

15. The method of claim 13 wherein:
the first transfer function is in the form of:

$$\frac{M_1 - M_2}{M_1 + M_2} = TF_M = \alpha_M DP + b_M; \text{ and}$$

the second transfer function is in the form of:

$$\frac{R_1 - R_2}{R_1 + R_2} = TF_R = \alpha_R DP + b_R;$$

where $M_1$ and $M_2$ refer to capacitances between main electrodes and a center diaphragm. And $R_1$ and $R_2$ refer to capacitances between the ring electrodes and the center diaphragm. $\alpha_M$ and $\alpha_R$ are gage factors, DP is an applied differential pressure and $b_M$ and $b_R$ are y-intercepts and the subscript M identifies the first and third capacitances and the subscript R identifies the second and fourth capacitances.

16. The method of claim 13 wherein including calculating the present value as:

$$H \equiv \frac{TF_R}{\alpha_R} - \frac{TF_M}{\alpha_M}.$$

17. The method of claim 10 wherein changes in the present value are indicative of a condition of an electrode.

18. The method of claim 10 including implementing the steps of the method in a microcomputer in a process transmitter.

19. The method of claim 10 wherein a fill fluid on one side of a deflectable diaphragm has a dielectric constant which differs from a dielectric constant of a fill fluid on the other side of a deflectable diaphragm.

20. The method of claim 19 wherein diagnosing operation comprises detecting leaks in the deflectable diaphragm.

* * * * *